Patented Dec. 11, 1928.

1,695,130

UNITED STATES PATENT OFFICE.

GUSTAV WIETZEL, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

PRODUCTION OF PURE CARBON MONOXIDE.

No Drawing. Application filed November 9, 1925, Serial No. 68,010, and in Germany November 21, 1924.

Carbon monoxide prepared from industrial gases, as for example water gas, or coke oven gas, for instance by means of ammoniacal cuprous chlorid solutions under pressure, always contains compounds of sulfur, especially of an organic nature which render it unsuitable for many chemical processes, especially those of catalytic nature and which can only be removed with difficulty.

I have now found that carbon monoxide is obtained in a nearly or entirely pure form by treating a gas containing carbon monoxide with steam in the presence of a suitable catalyst with the aid of which the carbon monoxide reacts with steam to form hydrogen and carbon dioxid, decomposing part of the carbon monoxide by said reaction. I have found that the organic sulfur compounds are then simultaneously decomposed, hydrogen sulfid being formed which can be easily removed. The unaltered carbon monoxide is then separated from the gas mixture. The separation may be effected by chemical or physical means, for example by absorption with cuprous salt solutions under pressure or by liquefaction and the like, preferably after the carbon dioxid and hydrogen sulfid have been removed. The decomposition of carbon monoxide to carbon dioxid may be reduced to a very small extent and nevertheless a gas containing only small traces of sulfur or no sulfur at all is obtained.

The process is carried out with special advantage if combined with the production of pure hydrogen or of pure mixtures containing hydrogen such as are used for catalytic purposes, for example for the hydrogenation of oils or the synthesis of ammonia. In this case the catalytic decomposition of carbon monoxide by means of steam is effected only to a small extent, and accordingly only small quantities of steam are necessary.

The following examples will serve to further illustrate the nature of my invention which however is not limited to these examples.

Example 1.

Water gas containing 6 per cent of carbon dioxid, 38.5 per cent of carbon monoxide, 47 per cent of hydrogen and 8.5 per cent of nitrogen is saturated with water vapor by passing it through water of 50 degrees centigrade and then passed at 500 degrees centigrade over a catalyst prepared according to the specification of Letters Patent No. 1,330,772. The resulting gas mixture after being freed from carbon dioxid and hydrogen sulfid by means of water and pressure, contains 31.4 per cent of carbon monoxide, 59.6 per cent of hydrogen and 9 per cent of nitrogen. The gas is washed under a pressure of 200 atmospheres with an ammoniacal cuprous formate solution. The saturated solution, when fractionally releasing the pressure evolves pure carbon monoxide which may be used for example for the production of hydrocyanic acid or of methyl formate.

Example 2.

A mixture of water gas and producer gas containing 5.1 per cent of carbon dioxid, 32.8 per cent of carbon monoxide, 40 per cent of hydrogen and 22.1 per cent of nitrogen is passed through water at about 80 degrees centigrade, whereby it is charged with water vapor. It is then passed over a catalyst suitable for inducing the reaction of steam and carbon monoxide, for example iron oxid, and freed from carbon dioxid and hydrogen sulfid by absorption with water under pressure. It then contains 6.8 per cent of carbon monoxide, 69.9 per cent of hydrogen and 23.3 per cent of nitrogen. The carbon monoxide is absorbed under pressure by means of an ammoniacal cuprous chlorid solution and can be obtained therefrom in a pure state by releasing the pressure.

The residual gas, freed from carbon monoxide, containing hydrogen and nitrogen in a proportion of about 3 to 1 is utilized for the synthesis of ammonia without releasing the pressure.

I claim:

1. The process of producing pure carbon monoxide by catalytically decomposing an impure gas containing carbon monoxide and sulphur compounds with steam so as to convert a portion of the carbon monoxide to carbon dioxid and substantially all of the sulfur compounds to hydrogen sulfid and separating the residual carbon monoxide and sulfur compounds from carbon dioxid and hydrogen sulfid.

2. The process of producing pure carbon monoxide and a mixture of pure hydrogen and nitrogen by catalytically treating an impure gas comprising carbon monoxide sulfur compounds, hydrogen and nitrogen with steam so as to convert a portion of the carbon monoxide to carbon dioxid and substantially all of the sulfur compounds to hydrogen sulfid, removing the carbon dioxid and hydrogen sulfid and separating pure carbon monoxide from a mixture of hydrogen and nitrogen.

3. The process of producing pure carbon monoxide by catalytically decomposing an impure gas containing carbon monoxide and organic compounds of sulfur with steam so as to convert a portion of carbon monoxide to carbon dioxid and substantially all of the sulfur compounds to hydrogen sulfid and separating the residual carbon monoxide from carbon dioxid and hydrogen sulfid.

4. The process of producing pure carbon monoxide and a mixture of pure hydrogen and nitrogen by catalytically treating an impure gas comprising carbon monoxide, organic compounds of sulfur, hydrogen and nitrogen with steam so as to convert a portion of the carbon monoxide to carbon dioxid and substantially all of the sulfur compounds to hydrogen sulfid, removing the carbon dioxid and sulfuretted hydrogen and separating pure carbon monoxide from a mixture of hydrogen and nitrogen.

In testimony whereof I have hereunto set my hand.

GUSTAV WIETZEL.